(12) United States Patent
Cazalens et al.

(10) Patent No.: US 8,015,813 B2
(45) Date of Patent: Sep. 13, 2011

(54) FUEL INJECTOR FOR INJECTING FUEL INTO A TURBOMACHINE COMBUSTION CHAMBER

(75) Inventors: Michel Pierre Cazalens, Bourron Marlotte (FR); Thomas Olivier Marie Noel, Vincennes (FR)

(73) Assignee: SNECMA, Paris (FR)

( * ) Notice: Subject to any disclaimer, the term of this patent is extended or adjusted under 35 U.S.C. 154(b) by 656 days.

(21) Appl. No.: 12/181,602

(22) Filed: Jul. 29, 2008

(65) Prior Publication Data
US 2009/0071158 A1 Mar. 19, 2009

(30) Foreign Application Priority Data
Jul. 30, 2007 (FR) ...................................... 07 56795

(51) Int. Cl.
F02C 7/22 (2006.01)
F02C 7/266 (2006.01)
(52) U.S. Cl. ................. 60/737; 60/740; 60/742; 60/748; 60/39.827; 431/258; 431/264
(58) Field of Classification Search ............... 431/2, 258, 431/264; 60/39.821, 39.827, 737, 738, 742, 60/746, 747, 748
See application file for complete search history.

(56) References Cited

U.S. PATENT DOCUMENTS

| | | | |
|---|---|---|---|
| 3,285,007 A * | 11/1966 | Carlisle et al. | ............ 60/749 |
| 5,628,180 A | 5/1997 | DeFreitas | |
| 5,640,841 A | 6/1997 | Crosby | |
| 6,453,660 B1 * | 9/2002 | Johnson et al. | ............ 60/39.821 |
| 7,114,337 B2 * | 10/2006 | Cazalens et al. | ............ 60/737 |

FOREIGN PATENT DOCUMENTS

| | | |
|---|---|---|
| EP | 1 225 392 A2 | 7/2002 |
| EP | 1 512 913 A1 | 3/2005 |

* cited by examiner

*Primary Examiner* — Louis Casaregola
*Assistant Examiner* — Steven Sutherland
(74) *Attorney, Agent, or Firm* — Oblon, Spivak, McClelland, Maier & Neustadt, L.L.P.

(57) ABSTRACT

A fuel injector for injecting fuel into a turbomachine combustion chamber, the injector presenting an injector nose for connection to an injection system fastened to the end wall of said combustion chamber, the injector nose comprising:
- a first channel for passing a flow of an air/fuel pre-mixture towards the combustion chamber, the first channel opening out into the center of the injector nose via an outlet opening for the air/fuel pre-mixture;
- an electrical insulator surrounding said outlet opening for the air/fuel pre-mixture;
- a plasma generator system disposed inside said electrical insulation and downstream from said outlet opening for the air/fuel pre-mixture in order to control ignition and combustion of the air/fuel pre-mixture;
- a second channel for passing a flow of fuel towards the combustion chamber, the second channel opening out outside said electrical insulation; and
- a third channel for passing a flow of fuel towards the combustion chamber, this third channel opening out outside the second channel.

6 Claims, 4 Drawing Sheets

FUEL INJECTOR FOR INJECTING FUEL INTO A TURBOMACHINE COMBUSTION CHAMBER

The invention relates to a fuel injector for injecting fuel into a turbomachine combustion chamber. The invention is for any type of terrestrial or aviation turbomachine, and more particularly for airplane turbojets.

BACKGROUND OF THE INVENTION

A turbomachine combustion chamber is generally annular in shape, centered on an axis X that corresponds to the axis of rotation of the rotor of the turbomachine. The combustion chamber has two annular walls (or shrouds) disposed coaxially about the axis X, and a chamber end wall arranged between said shrouds in the upstream region of said chamber. Said chamber walls define the combustion enclosure of the chamber.

A plurality of fuel injection systems are fastened to the end wall of the chamber (in orifices provided for this purpose through the chamber end wall), and they are distributed regularly around the axis X. A fuel injector is connected to each injection system.

An injection system generally comprises a central hole for receiving the free end of a fuel injector, and a plurality of air admission passages disposed concentrically around said central hole. These air admission passages generally serve to swirl air, i.e. they are constituted by annular passages having series of vanes extending therein for imparting rotary motion to the air passing therethrough. The air passing through these admission passages comes from the diffuser of the turbomachine, which diffuser is situated upstream from the combustion chamber. This air is mixed with fuel delivered by said injector so as to form an air/fuel mixture that is burnt in the combustion chamber.

The injector is a part that passes through the "combustion chamber module" of the turbomachine from the outer casing of said module to the end wall of the chamber. The injector comprises the fuel feed pipe(s) (forming part of a fuel manifold) that serve(s) to convey fuel for injection into the chamber. The fuel is expelled from the free end, or "nose", of the injector.

The invention relates to a fuel injector and not to the injection system to which the injector is connected.

The conventional process for designing and optimizing an airplane turbojet combustion chamber seeks to reconcile the expected operating performance (typically: fuel efficiency, stability range, ignition and re-ignition range, combustion area lifetime, temperature distribution at the outlet from the combustion area) depending on the intended mission of the airplane, with reducing polluting emissions (NOx, CO, UHC, soot).

A known solution for reducing polluting emissions, in particular those involving nitrogen oxides (of the NOx type) is to ensure that the combustion flame is in the presence of an air/fuel mixture that is rich or lean. For example, a leaner air/fuel mixture can be obtained for the combustion flame by increasing the flow rate of the air delivered to the combustion (mainly the flow rate through the end wall of the chamber).

Experience shows that this solution based on a lean mixture is effective in reducing NOx. Nevertheless, when attempts are made to take this solution to its potential maximum in terms of reducing polluting emissions (for a combustion area of fixed shape and thus of constant air distribution), it suffers from the following drawback: the stability of the combustion flame is affected (i.e. the vulnerability of the flame to being blown out is increased), in particular at low operating speeds of the turbojet, such that idling stages can no longer be obtained for the engine; the combustion efficiency at intermediate operating speeds is reduced; when the airplane is on the ground, it is more difficult to ignite the flame; and re-igniting the flame when the airplane is at altitude is also more difficult.

OBJECTS AND SUMMARY OF THE INVENTION

An object of the invention is to overcome the above-mentioned drawbacks.

To achieve this object, the invention provides a fuel injector for injecting fuel into a turbomachine combustion chamber, the injector presenting an injector nose for connection to an injection system fastened to the end wall of said chamber, the injector nose comprising:
  a first channel for passing a flow of an air/fuel pre-mixture towards the combustion chamber, the first channel opening out into the center of the injector nose via an outlet opening for the air/fuel pre-mixture;
  an electrical insulator surrounding said outlet opening for the air/fuel pre-mixture;
  a plasma generator system disposed downstream from said outlet opening for the air/fuel pre-mixture in order to control ignition and combustion of the air/fuel pre-mixture; and
  a second channel for passing a flow of fuel towards the combustion chamber, the second channel opening out outside said electrical insulation.

The idea on which the invention is based thus consists in incorporating an additional circuit in a fuel injector, the additional circuit generating a more or less rich air/fuel pre-mixture, and in controlling ignition and combustion of said air/fuel pre-mixture by means of a plasma generator system.

It should be observed that when referring to the air/fuel mixture flowing in the first channel, it is preferable to call it a "pre-mixture" so as to clearly distinguish this air/fuel pre-mixture from the air/fuel mixture that is burnt in the combustion chamber, and that is obtained by mixing the fuel leaving the second channel with air passing through the admission passages of the injection system. It should also be observed that in general only a small fraction of the total quantity of injected fuel is involved with providing the pre-mixture.

By controlling ignition and combustion of the air/fuel pre-mixture by means of a plasma generator system, it is ensured that combustion is stable at all engine speeds, independently of the richness of the air/fuel mixture providing the combustion flame, with this contributing to improving combustion efficiency, in particular at intermediate operating speeds of the turbojet. This makes it possible to reduce emissions of carbon monoxide (CO) and of unburned hydrocarbons (UHC).

Another advantage of the invention is to reduce the vulnerability of the combustion flame to ingestion of water or ice.

Finally, integrating the ignition function in the injector makes it possible to eliminate the spark plug ignition system that is commonly used in conventional injection systems and that is disposed downstream from the injector, thereby also eliminating problems associated with incorporating such a spark plug ignition system (in particular problems of sealing, of expansion, and of the aerodynamic wake generated behind such a system and disturbing flow downstream).

The function of the electrical insulation is to create, within the injector, two zones at different electric potentials, the injector being made for the most part out of metal materials, i.e. materials that conduct electricity. It then becomes possible to create an electric discharge for producing a plasma between these two zones.

In an embodiment, the plasma generator system comprises: a first electrode fastened on said electrical insulation without making contact with the remainder of the injector; an electric wire passing inside said insulation and connected to the first electrode; and a second electrode in contact with a portion of the injector that is made of an electrically-conductive material.

In a possible configuration, the electric wire delivers high voltage to the first electrode, and the portion of the injector in contact with the second electrode acts as ground. Naturally, other configurations could be envisaged.

In an embodiment, said second channel presents a fuel outlet opening that is generally circular in shape. In particular, this outlet opening may be an injection slot, or it may be made up of a plurality of injection orifices disposed in a circle.

In an embodiment, a passage is provided between the first channel and the second channel so that fuel from the second channel is used for making the air/fuel pre-mixture of the first channel. There is thus no fuel circuit that is specially dedicated to providing the air/fuel pre-mixture, thereby simplifying the structure of the injector nose and reducing its size.

BRIEF DESCRIPTION OF THE DRAWINGS

The invention and its advantages can be better understood on reading the following detailed description made by way of non-limiting illustration. The description makes reference to the accompanying figures, in which.

MORE DETAILED DESCRIPTION

Figure 1:
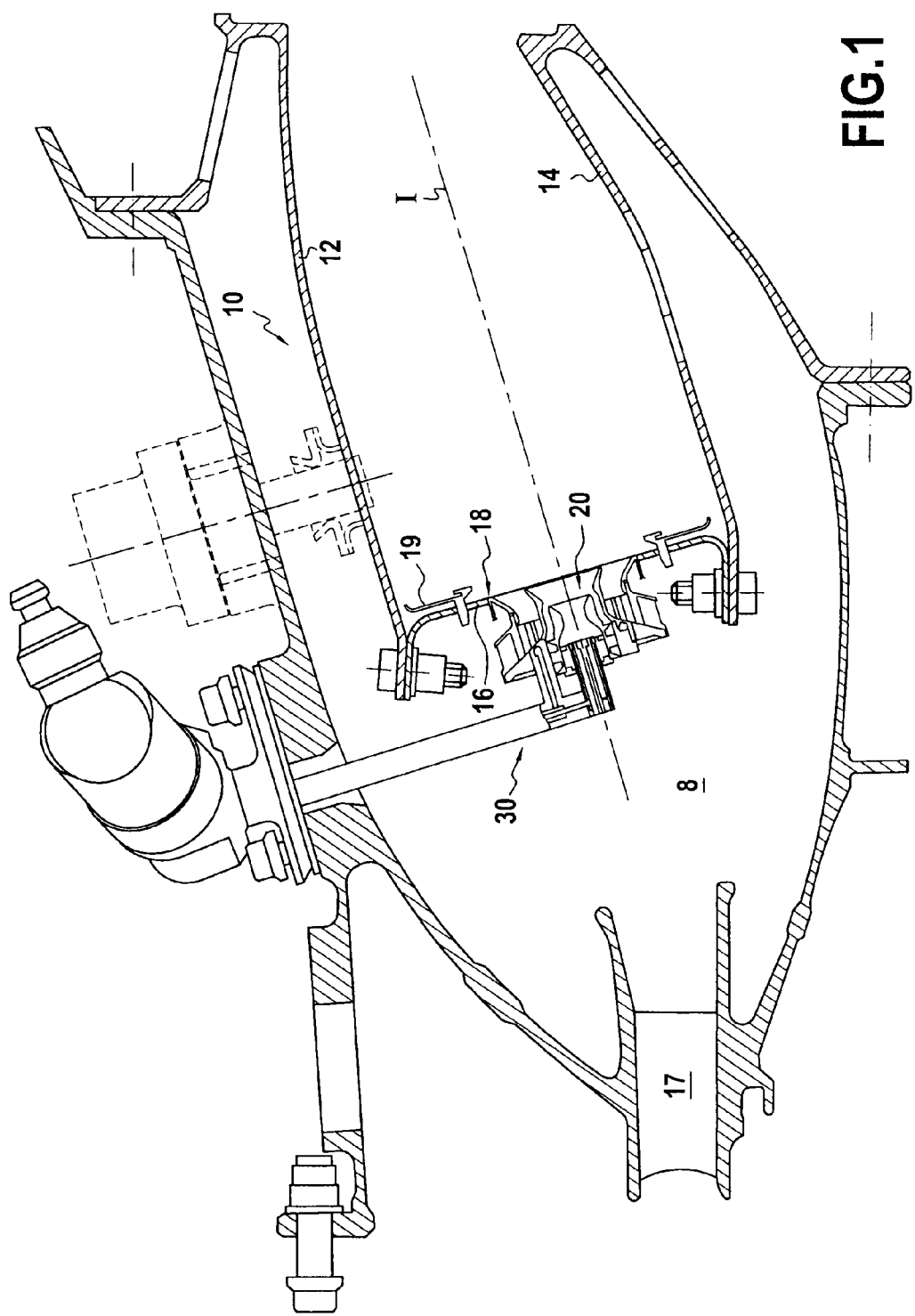
FIG. 1 shows an example of a combustion chamber in axial half-section on the axis of rotation X of the rotor of the turbojet.

The example combustion chamber 10 shown in FIG. 1 is shown in its environment inside a turbojet. The chamber 10 is annular, centered on the axis of rotation X of the rotor of the turbojet. This combustion chamber is said to be "axial" since it extends generally along the axis X.

The invention could also be applied to other types of turbomachine and to other types of combustion chamber, in particular to angled radial combustion chambers, i.e. combustion chambers that are angled and that have a portion extending generally radially relative to the axis X.

The term "combustion chamber module" 8 is generally used to designate the housing receiving the combustion chamber 10. The combustion chamber module 8 is fed with compressed air by the diffuser 17 of the turbojet.

The combustion chamber 10 has two annular walls (or shrouds): an inner wall 12; and an outer wall 14. These walls 12 and 14 are spaced apart from each other and they are positioned coaxially around the axis X. These walls 12, 14 are interconnected by a chamber end wall 16 extending between them in the upstream region of the chamber 10. Between them, the walls 12, 14, and end wall 16 define the combustion enclosure of the chamber 10.

The chamber end wall 16 presents a plurality of openings 18 that are regularly distributed around the axis of rotation X.

The chamber 10 also has deflectors 19 mounted on the chamber end wall 16 at the peripheries of the openings 18 so as to protect the end wall 16 from the high temperatures reached during combustion.

Inside each opening 18, there is mounted an injection system 20, and each injection system 20 has an injector 30 connected thereto.

Figure 2:
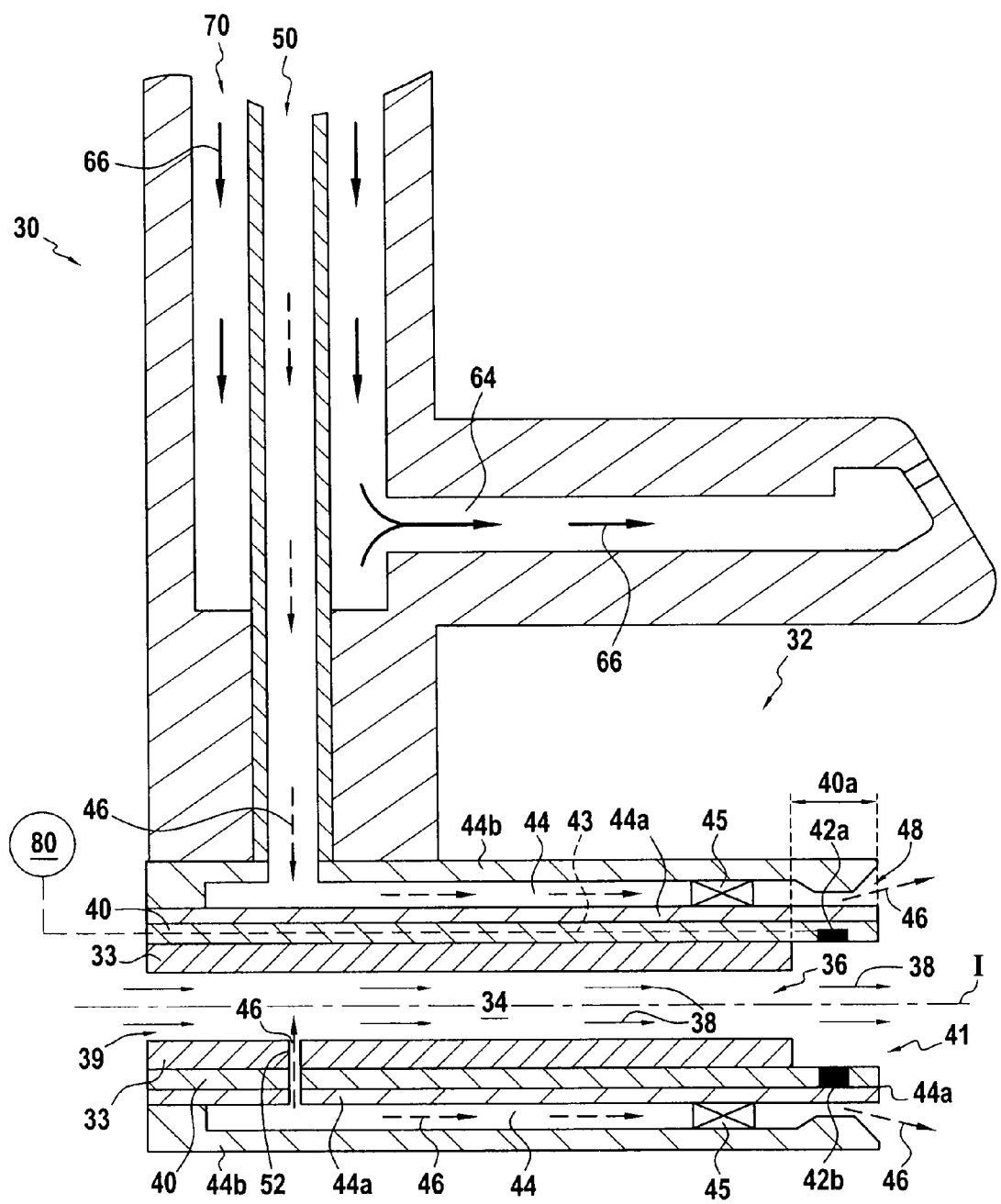
FIG. 2 shows an example of an injector of the invention in axial section on the injection axis I of the air/fuel pre-mixture.
Figure 3:
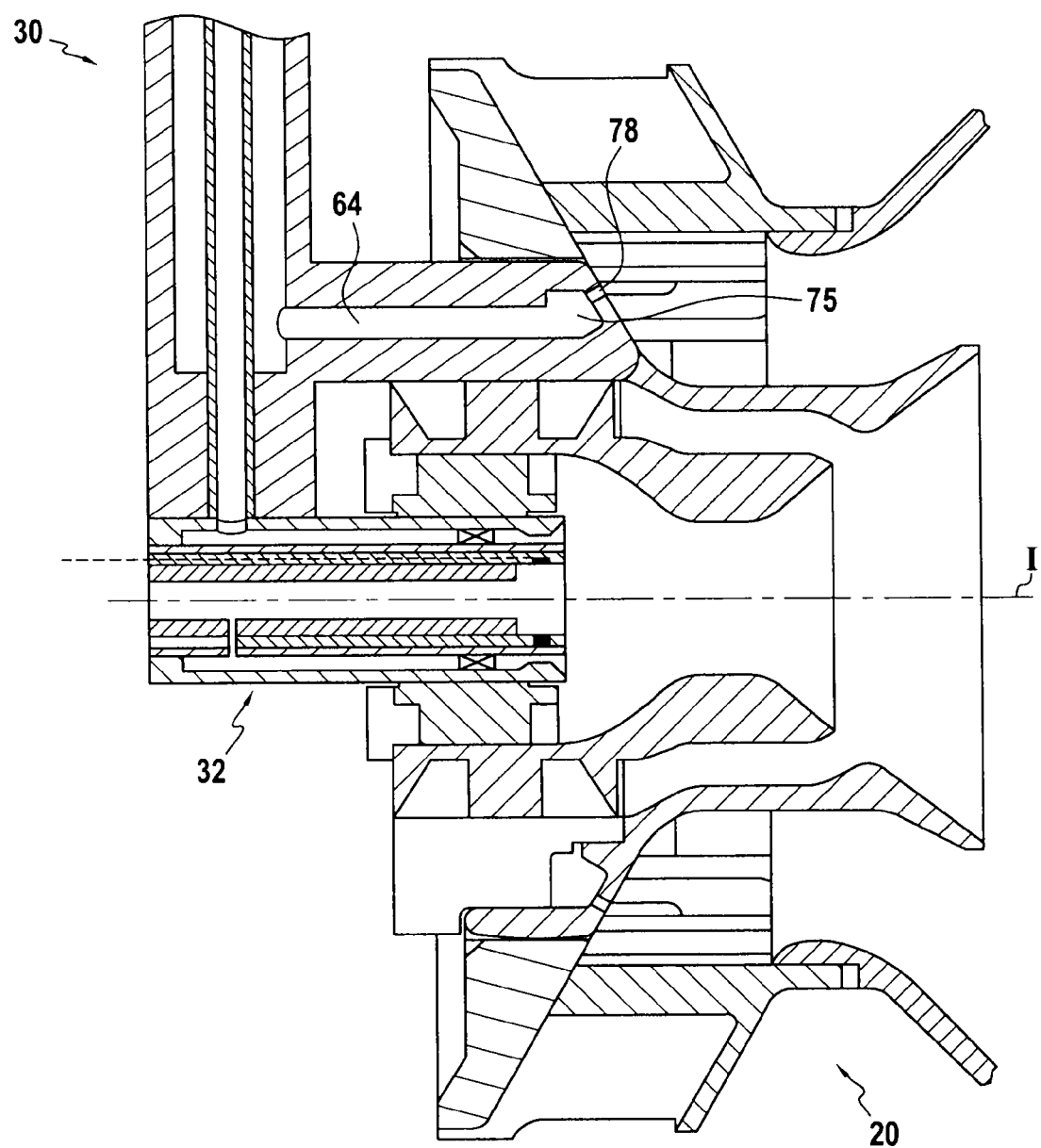
FIG. 3 shows the FIG. 2 injector connected to an example injection system.

With reference to FIGS. 1 to 3, there follows a description of a first example of an injector 30 of the invention.

The term "injector nose" 32 is used to designate the free end portion of the injector 30 that is for connection to the injection system 20. At its center, the injector nose 32 includes a first channel 34 for passing the flow of an air/fuel pre-mixture 38 towards the combustion chamber. This pre-mixture is injected along the injection axis I. The first channel 34 opens out in the center of the injector nose via an outlet opening 36.

Around the first channel 34 the injector nose 32 comprises, in this order:
electrical insulation 40 surrounding the outlet opening 36 for the air/fuel pre-mixture 38;
a plasma generator system 41 placed downstream from said opening 36 in order to control the ignition and combustion of the air/fuel pre-mixture 38; and
a second channel 44 for passing a flow of fuel 46 towards the combustion chamber, this second channel 44 opening out outside said electrical insulator via a circular outlet slot 48 centered on the axis I.

All of the above elements are combined in a single assembly referred to as a single "head", that is connected to the injection system in a single location.

With respect to the injector 30, "upstream" and "downstream" are defined relative to the flow direction of the pre-mixture 38 or of the fuel 46 (flowing from upstream to downstream). Furthermore, the axial direction corresponds to the direction of the pre-mixture injection axis I, and a radial direction is a direction perpendicular to the axis I. Finally, unless specified to the contrary, the adjectives "inner" and "outer" are used with respect to a radial direction such that the inner portion (i.e. the radially-inner portion) of an element is closer to the axis I than is an outer portion (i.e. radially-outer portion) of the same element.

The first channel 34, the electrical insulator 40, and the second channel 44 are substantially circularly symmetrical about the axis I. The channel 34 is generally tubular in shape. The insulation 40 and the channel 44 are generally annular in shape, centered on the axis I.

The first channel 34 extends along the axis I. At its upstream end, it presents an air inlet opening 39 through which air enters coming from the diffuser 17. This air is used to make the air/fuel pre-mixture 38.

The electrical insulation 40 is a tubular cover centered on the axis I, surrounding the outer tubular wall of the first channel 34 and extending along said first channel 34 from the air inlet opening 39 as far as the outlet opening 36 for the pre-mixture 38, such that a portion of electrical insulation 40a projects downstream beyond the outlet opening 36.

The plasma generator system 41 is constituted by an array of at least two electrodes, including a high voltage electrode 42a and a low voltage electrode 42b. The high voltage electrode 42a is fastened to the portion 40a of insulation (to the inside thereof), without making contact with the remainder of the injector. An electric wire 43 extending within the mass of the insulation 40 and connected to an alternating current (AC) generator 80 delivers the high voltage to the electrode 42a.

The low voltage electrode 42b is housed in an opening 49 passing through the thickness of the insulation 40, such that the electrode 42b comes directly into contact with the inside wall 44a of the second channel 44. This wall 44a is made of an electrically conductive material and acts as ground. The electrodes 42a and 42b face the axis I and are diametrically opposite each other.

The AC generator 80 to which the high voltage electrode 42a is connected serves to generate a voltage presenting parameters that are optimized as a function of the operating speed of the turbojet, of the chemical species that it is desired to produce (radicals, excited species), of the degree of pre-fragmentation desired for the molecules of fuel, and of the intended function: ignition; re-ignition at altitude; extension of the stable operating range; active control of the combustion area. This AC generator 80 thus presents special characteristics. In this example, the AC generator 80 serves to create a "streamer" type plasma (i.e. with propagation of an ionization front), and the AC generator 80 presents a pulse duration shorter than 50 nanoseconds (ns) and a potential difference that is variable and controllable. The rise time, the pulse duration, and the repetition rate are all controllable so as to be able to adapt to the operating speed.

The second channel 44 is defined between two tubular walls, an inner wall 44a and an outer wall 44b, the downstream end of the outer wall and/or of the inner wall presenting an internal outline that converges and diverges (i.e. that forms a Venturi). In the example described this is the internal outline of the outer wall 44b. This converging/diverging configuration serves to accelerate the fuel prior to being injected into the chamber. This acceleration makes it possible to reduce, or even eliminate, the wake from the vanes of the swirler 45 (see below) and encourages atomization of the fuel.

A swirler 45 is present inside the second channel 44, upstream from said converging/diverging internal outline. The swirler 45 is made up of a plurality of vanes extending radially between the inner and outer tubular walls 44a and 44b, and distributed regularly around the inner wall 44a. The swirler 45 serves to impart rotary motion to the fuel 46 that passes along the channel 44.

The second channel 44 is fed with fuel by a first feed pipe 50 (forming part of a fuel manifold). The pipe 50 opens out into the upstream portion of the channel 44.

In addition, a passage 52 is provided between the first channel 34 and the second channel 44 such that the fuel 46 of the second channel 44 is used for making the air/fuel pre-mixture 36 in the first channel 34. More precisely, the passage 52 passes through the inner wall 44a of the second channel 44, the insulation 40, and the tubular wall 33 of the first channel 34 so as to open out into the upstream portion of the channel 34.

The injector nose 32 has a third channel 64 for passing a flow of fuel 66 to the combustion chamber, this third channel 64 opening out (radially) outside the second channel 44. This third channel 64 is radially offset from the second channel so that it is not connected to the injection system 20 at the same location as the "head" assembly constituted by the first and second channels.

The third channel 64 is fed with fuel via a second feed pipe 70. The third channel 64 terminates in an annular chamber 75 that is centered on the axis I and that is pierced by orifices 78 that are regularly distributed around the axis I and that enable fuel 66 to be injected into the combustion chamber 10.

The second channel 44 enables a first cloud of fuel 46 to be injected from the center of the injection system 20. The third channel 64 acts via the annular chamber 75 and the orifices 78 to inject a second cloud of fuel 66. This second cloud of fuel 66 is generally annular in shape, substantially centered on the axis I, and surrounds the first cloud of fuel 46.

The clouds of fuel 44 and 46 are mixed with flows of air passing through the air admission orifices (air swirlers) of the injection system 20.

The injector 30 thus has two fuel circuits: a "pilot" circuit comprising the feed pipe 50 and the second channel 44 in which the fuel 46 flows; and a "takeoff" circuit in which the fuel 66 flows.

Ignition and combustion of the air/fuel pre-mixture 36 is controlled by the plasma generator system 41. Since the combustion propagates to the cloud of fuel 46, this also controls ignition and combustion of the air/fuel pre-mixture of the "pilot" circuit.

The quantities of fuel in the "pilot" and "takeoff" circuits are controlled in such a manner as to limit toxic gas emissions at all operating speeds of the turbojet.

On starting, on restarting the turbojet (i.e. during ignition and flame propagation stages), and during the stage of spinning up and at low speeds (typically idling speeds), only the "pilot" circuit operates. At full-throttle operation the "pilot" circuit and the "takeoff" circuit are both fed with fuel, with the distribution of fuel being selected in such a manner as to achieve lean combustion, i.e. that produces little NOx or smoke in either of the two circuits.

Figure 4:
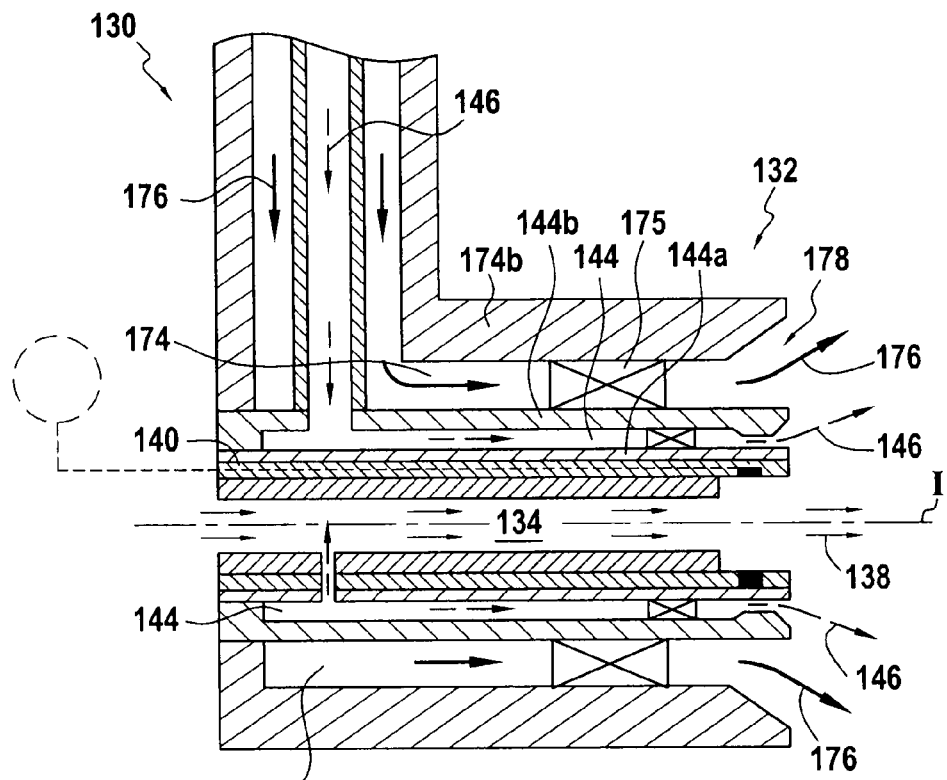
FIG. 4 shows another example injector of the invention in axial section on the injection axis I of the air/fuel pre-mixture.
Figure 5:
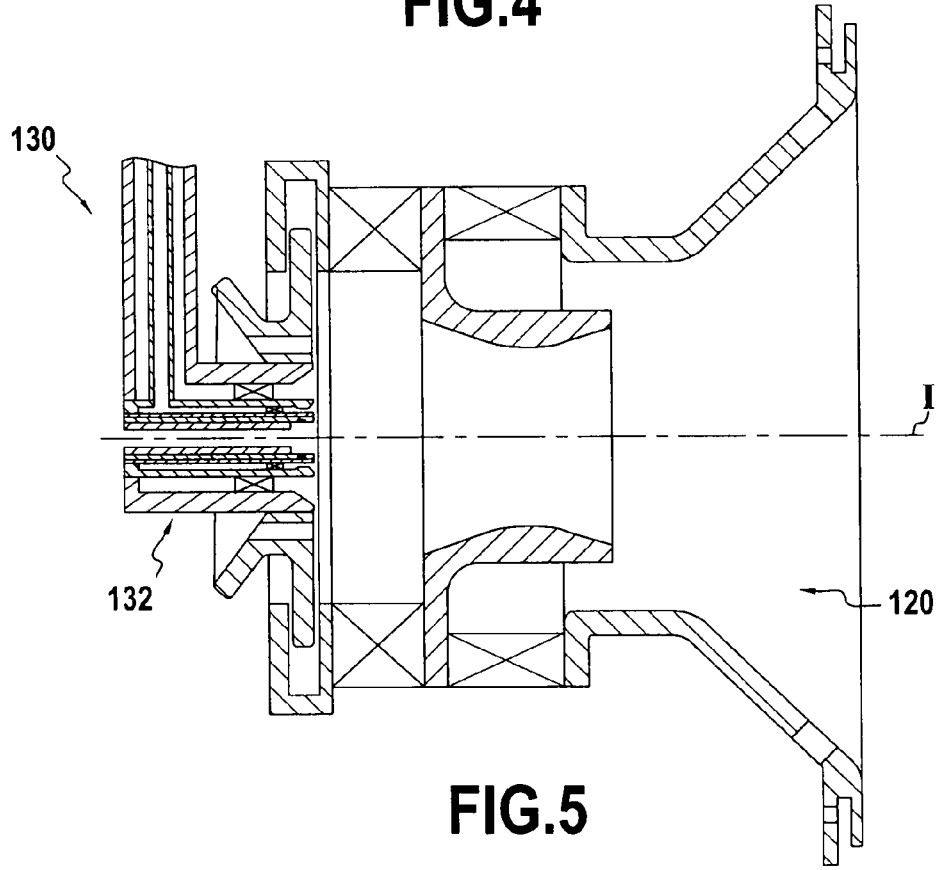
FIG. 5 shows the FIG. 4 injector connected to another example injection system.

With reference to FIGS. 4 and 5, there follows a description of a second example of an injector 130 of the invention. Elements or portions of this injector 130 that are analogous to elements or portions of the injector 30 of FIGS. 1 to 3 are identified by the same numerical references plus 100.

The injector 130 differs from the injector 30 in that the third channel is situated immediately outside the second channel 144. In this example, the tubular wall 144b defining the outside of the second channel 144, also defines the inside of the third channel 174. The third channel 174 opens out directly into the combustion chamber outside the second channel 144 via an outlet opening of generally circular shape 178, thus enabling fuel 176 to flow into the chamber. The first, second, and third channels, 134, 144, and 174 are thus united in a single assembly or "head" that is connected to the injection system 120 in a single location, i.e. inside the central orifice of the system 120.

The internal outline of the tubular wall 174b that defines the outside of the third channel 174 diverges at the downstream end of said wall. A swirler 175 is present inside the third channel 174, upstream from said diverging outline.

Injectors 130 of the type shown in FIGS. 4 and 5 are preferably used together with a so-called "aero-mechanical" injection system 120 of the type shown in FIG. 5, whereas the injectors 130 of the type shown in FIGS. 1 to 3 are preferably used together with a so-called "multipoint" injection system 20 of the type shown in FIG. 3.

What is claimed is:

1. A fuel injector for a turbomachine combustion chamber, the injector presenting an injector nose for connection to an injection system fastened to the end wall of said combustion chamber, the fuel injector comprising:

a first channel for passing a flow of an air/fuel pre-mixture towards the combustion chamber, the first channel opening out into the center of the injector nose via an outlet opening for the air/fuel pre-mixture;

an electrical insulator surrounding said outlet opening for the air/fuel pre-mixture;

a plasma generator system disposed downstream from said outlet opening for the air/fuel pre-mixture in order to control ignition and combustion of the air/fuel pre-mixture;

a second channel for passing a flow of fuel towards the combustion chamber, the second channel opening out outside said electrical insulation and concentrically with said first channel; and a third channel for passing a flow of fuel towards the combustion chamber, this third channel opening out outside and radially offset the second channel.

2. A fuel injector according to claim 1, in which a passage is provided between the first channel and the second channel so that fuel from the second channel is used for making the air/fuel pre-mixture of the first channel.

3. A fuel injector according to claim 1, in which the plasma generator system comprises at least two electrodes, the plasma being generated by an electric discharge created between the two electrodes.

4. A fuel injector according to claim 1, in which the plasma generator system comprises: a first electrode fastened on said electrical insulation without making contact with the remainder of the injector; an electric wire passing inside said insulation and connected to the first electrode; and a second electrode in contact with a portion of the injector that is made of an electrically-conductive material.

5. A turbomachine combustion chamber fitted with a plurality of injection systems fastened to the end wall of the chamber, and a plurality of fuel injectors according to claim 1, the fuel injectors being connected to the injection systems.

6. A turbomachine comprising a combustion chamber according to claim 5.

* * * * *